INVENTOR
JOHN E. AINSWORTH, JR.

BY Richard C. Reed
ATTORNEY

May 8, 1962 J. E. AINSWORTH, JR 3,033,924
ROCKET BORNE TELEVISION SYSTEM
Filed Jan. 23, 1959
4 Sheets-Sheet 2

INVENTOR
JOHN E. AINSWORTH, JR

BY Richard F. Reed
ATTORNEY

INVENTOR
JOHN E. AINSWORTH, JR.

BY Richard O. Reed
ATTORNEY

May 8, 1962 J. E. AINSWORTH, JR 3,033,924

ROCKET BORNE TELEVISION SYSTEM

Filed Jan. 23, 1959 4 Sheets-Sheet 4

INVENTOR
JOHN E. AINSWORTH, JR.

BY Richard C. Reed

ATTORNEY

United States Patent Office 3,033,924

Patented May 8, 1962

3,033,924

ROCKET BORNE TELEVISION SYSTEM

John E. Ainsworth, Jr., Arlington, Va., assignor to the United States of America as represented by the Secretary of the Navy Filed Jan. 23, 1959, Ser. No. 788,694
7 Claims. (Cl. 178—6.8)
(Granted under Title 35, U.S. Code (1952), sec. 266)

The invention described herein may be manufactured and used by or for the Government of the United States of America for governmental purposes without the payment of any royalties thereon or therefor.

This invention relates in general to a method of reporting surrounding bodies and phenomena by television and in particular to single-line scanning and reporting from a revolving object.

The prior art discloses airborne television cameras for collecting and transmitting information relative to adjacent aircraft and nearby terrain, but with accompanying distortion and limitations in information reproduction imposed by the relative speed of the camera to the objects viewed, and/or lateral motion between the target and camera. Many prior art devices for reporting information from moving objects by photoelectric means require artificial illumination of the surface or area to be reported thereby severely limiting the distance across which effective reporting can be made.

Accordingly, it is an object of the present invention to provide means for television reporting of remote bodies and phenomena by utilization of reflected or radiant energy therefrom.

Another object of the present invention is to provide a means for obtaining and instantly reporting the aspect of a revolving vehicle.

A further object of this invention is to reduce television system distortion to one dimension by use of the single-line scan method of image transfer and reproduction.

Other objects and advantages of this invention will become apparent upon a careful consideration of the following description when read in conjunction with the accompanying drawings in which like reference numerals designate like parts throughout the figures thereof and wherein.

Figure 4A:
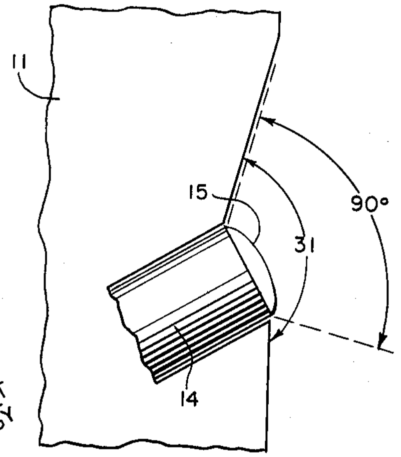
Figure 4B:
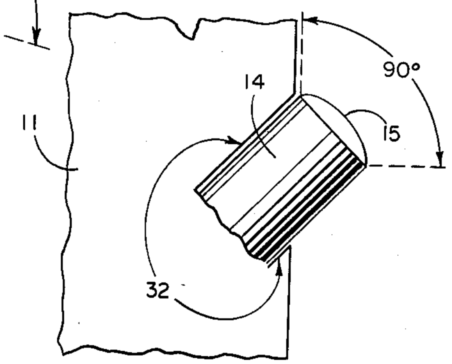
Figure 4C:
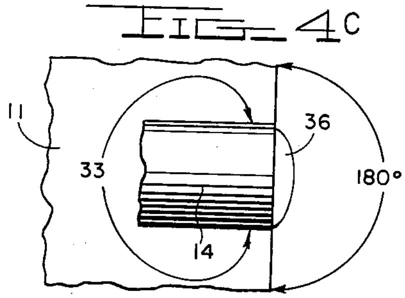

FIGS. 4*a*, 4*b* and 4*c* show three alternate apertures for use in the first and second embodiments.

Figure 5:
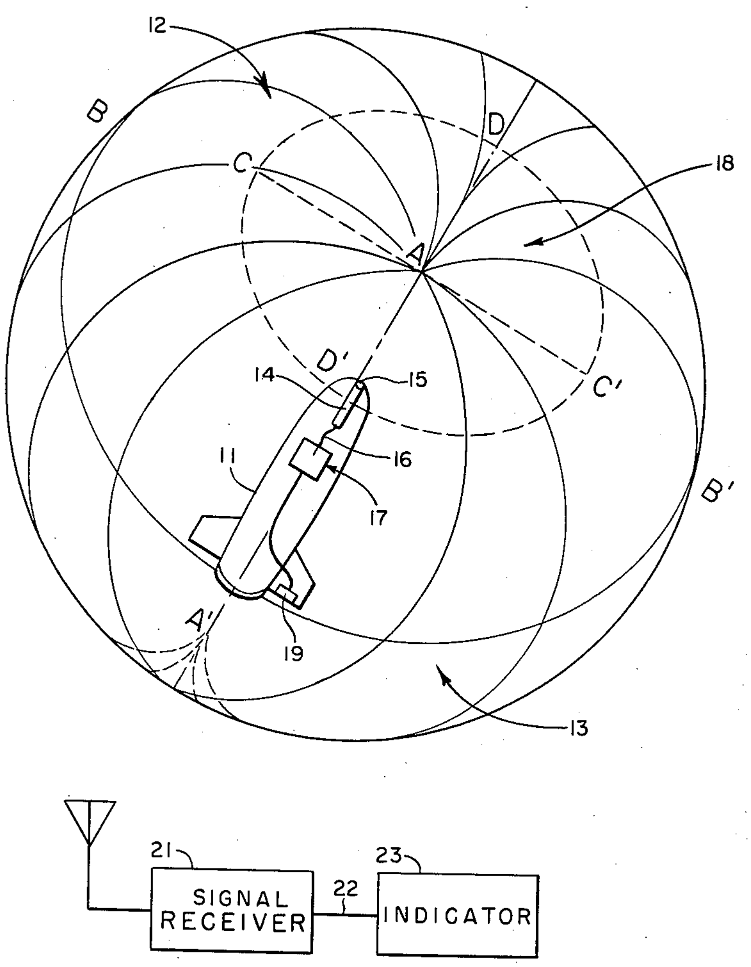

FIG. 5 is a schematic diagram of a third embodiment of the present invention.

FIGS. 6*a*, 6*b*, 6*c* and 6*d* show alternate indicating means for use with embodiments of the present invention.

In accordance with the teachings of the present invention, a single-line scan television system is provided for reporting at a remote station the scene viewed by a television camera installed in a revolving object. The revolving television camera receives reflected or radiant energy from bodies and phenomena in space, transforms the radiant energy into electric pulses, and transmits the pulses or signals to a control center or viewing station where the intensity pattern of the incident energy is displayed. Accurate reproductions may be obtained even when the television camera is revolving at a much greater rate than would cause blurring in a conventionally televised transmission. A variety of indicating means may be employed to display the remote reproduction of the televised scene.

Figure 1:
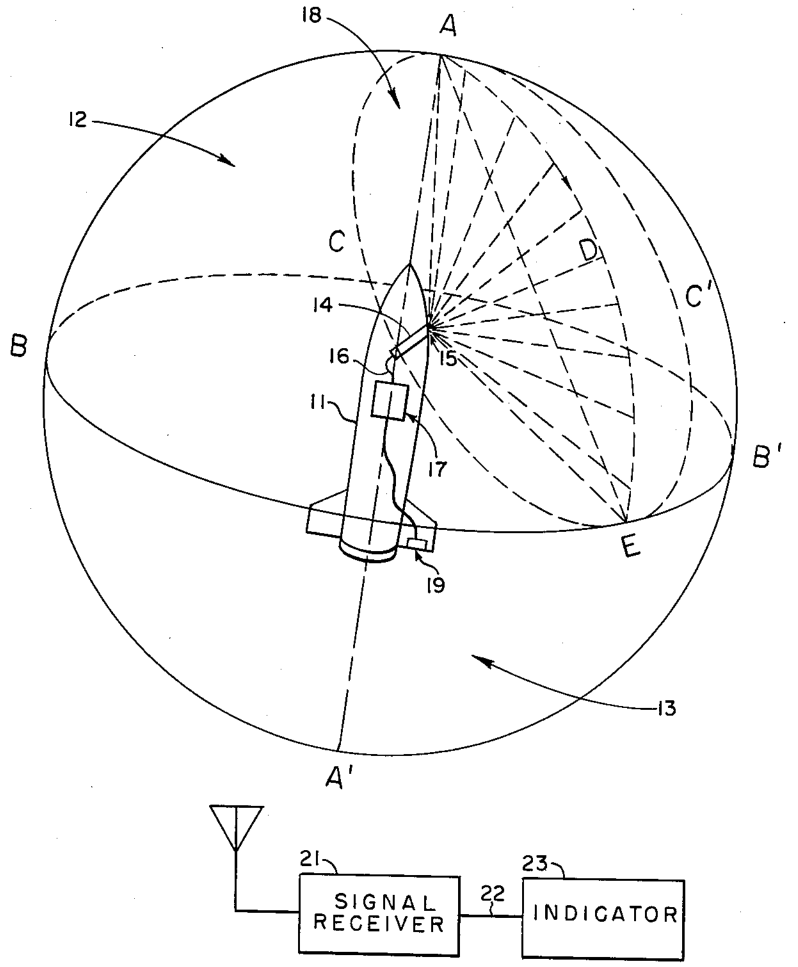
FIG. 1 shows a schematic diagram of a first embodiment of the present invention.

Referring to FIG. 1, object 11 is depicted as in space above the earth's surface and revolving about axis AA'. The celestial sphere within which it is revolving is indicated as ABA'B' and comprises hemispheres 12 and 13. Television camera tube 14 is mounted on object 11 so that wide angle lens 15 associated therewith transmits and focuses reflected or radiant energy from area ACEC' into the camera tube. The focused image of area ACEC' is scanned along line ADE by camera tube 14 and the scan information conducted to transmitter 17 via cable 16 and thence to antenna 19. At a remote station, on the earth's surface, for example, signal receiver 21 reforms the information from transmitter 17, and cable 22 relays the scan information to indicator 23 where it may be displayed in a variety of different manners some of which are explained in more detail in connection with FIG. 6. In a preferred embodiment of the present invention lens 15 is a 90-degree wide-angle lens, however, it is understood that lenses of smaller or larger angle may be used to focus a desired area for scanning by the television camera tube 14.

While a conventional camera tube of the type having a relatively large photosensitive surface is shown in the drawings, it will be appreciated that such a large photosensitive surface is not essential to the invention. Since only a small portion of the surface is subject to the scanning beam, the size of the surface can be substantially reduced by eliminating the region of the surface which is not scanned. Preferably, the photosensitive surface has an elongated configuration.

Figure 2:
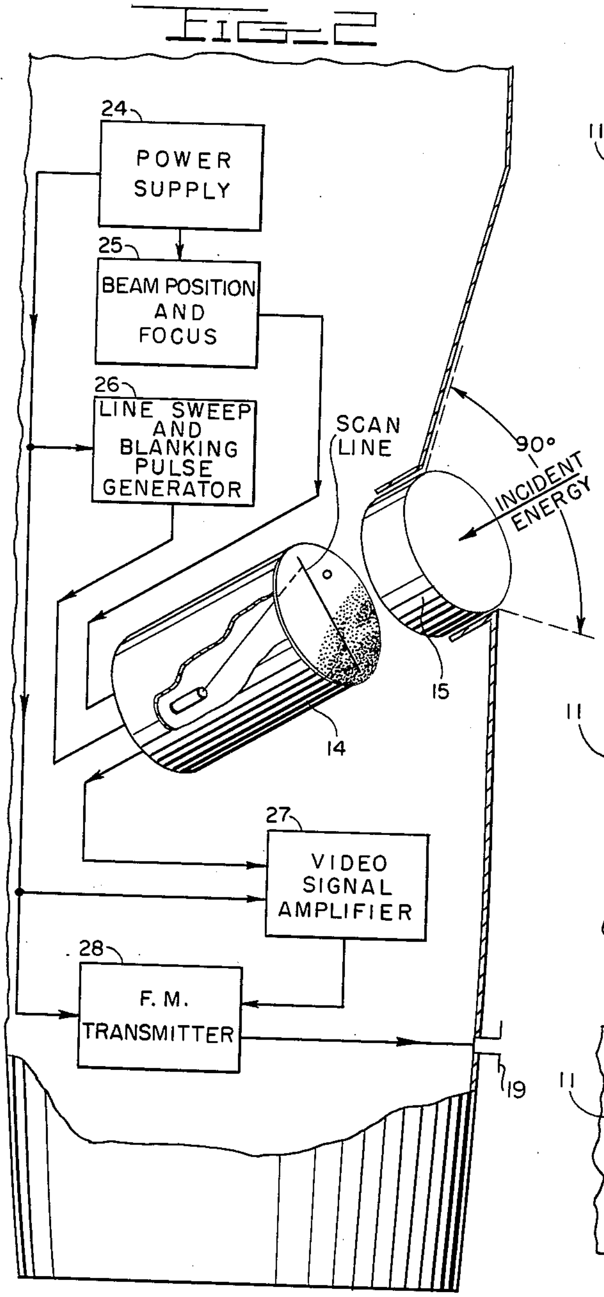
FIG. 2 is a block diagram of equipment used in the first embodiment.

FIG. 2 presents a block diagram of a single line scan arrangement showing the components assembled to provide the necessary information and to relay that information to a remote station. Power supply 24 may consist of lead-acid storage cells or mercury cells or similar sources of potential. The beam of electrons is controlled by beam position and focus apparatus 25, while uniform motion of the electron beam across the scan line of television camera tube 14 as well as substitution for the picture signal of a signal whose instantaneous amplitude is such as to make the return trace invisible is accomplished by the line sweep and blanking pulse generator 26. The picture signal is amplified by video amplifier 27 to a level required to modulate the transmitting device. FM transmitter 28 varies the frequency of the wave to be transmitted with time and supplies the power to antenna 19 necessary to radiate the signal through space.

Figures 3, 6A, 6B, 6C, 6D:
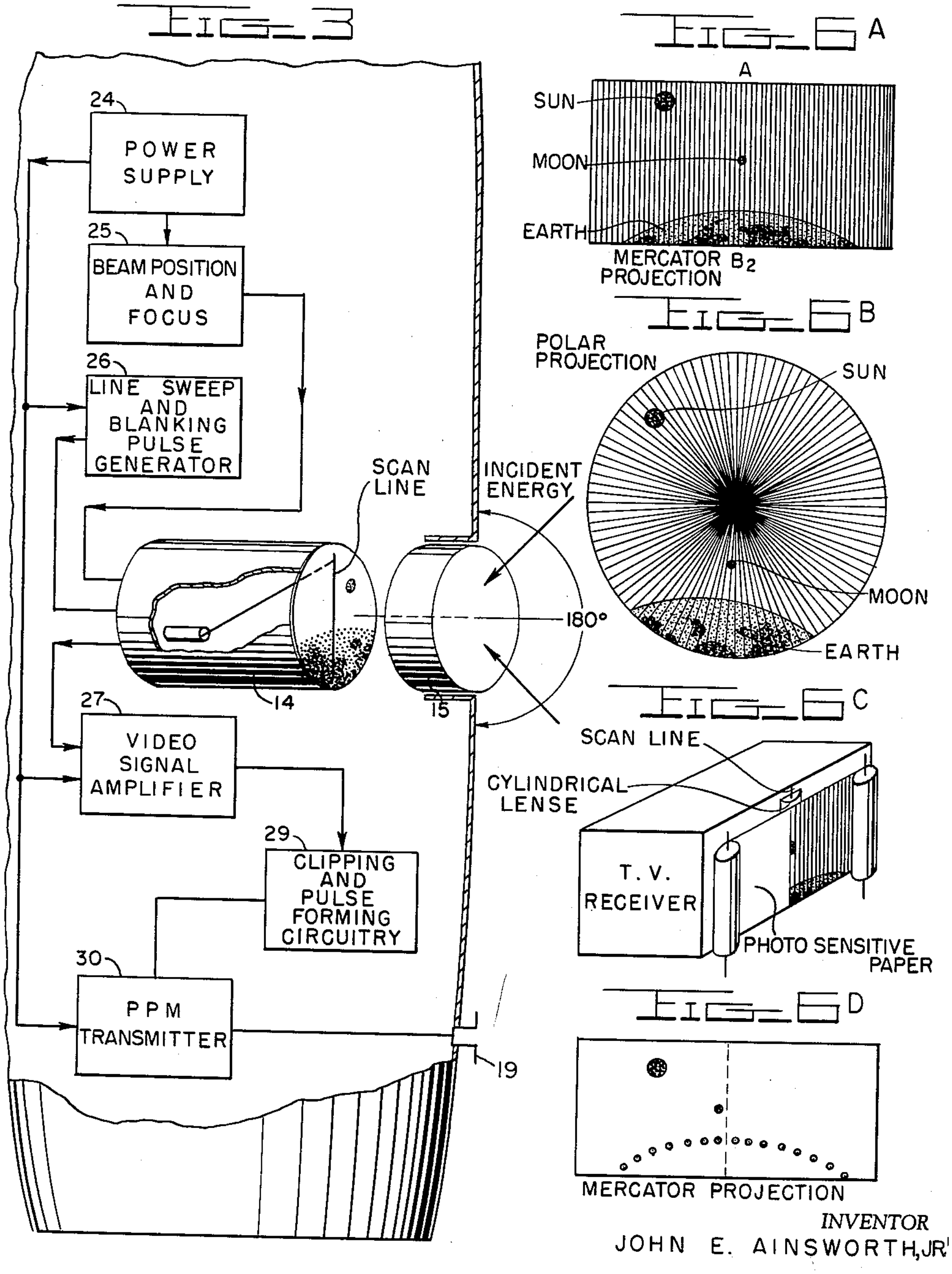
FIG. 3 is a block diagram of equipment used in a second embodiment of the present invention.

In FIG. 3, the components shown in FIG. 2 are complemented by the addition of clipping and pulse forming circuitry 29 and by the substitution of a pulse position modulation (PPM) transmitter 30 for FM transmitter 28. The clipping and pulse forming circuitry 29 produces a desired waveform by exponentially changing voltages and currents and by a clipping or limiting action. The pulse position transmitter 30 is installed to sample each of 15 channels 312.5 times a second although 4 channels can be used to give a single channel a sampling rate of 1250 times a second if required. The PPM transmitter 30 was designed to operate with a specific receiving station. Of course, a wide variety of PPM transmitters and associated receivers are available and may be utilized to transfer scan information from the television camera tube to a display device, the primary function of many such transmitter-receiver systems being to permit relaying of information from several devices within the carrier at selected time intervals.

The television camera tube 14 may be mounted in various types of apertures, selection of a particular type being determined by the region of the surrounding area desired to be scanned. An aperture such as 31 in FIG. 4A will accommodate 90-degree lens 15 thereby including a spherical sector of the imaginary sphere surrounding object 11 and omitting, of course, the zenith and nadir of the object. In FIG. 4B, aperture 32 will accommodate 90-degree lens 15 and relay information from a spherical sector 90 degrees wide which includes the zenith of object 11. In FIG. 4C aperture 33 is constructed to accommodate 180-degree lens 36. A camera tube having such a lens will scan, during one revolution of object 11, hemispheres 12 and 13. The scanning of such a large area permits the production of a mercator projection of an entire sphere when displayed as shown in FIG. 6A. Aperture 33 in FIG. 4C thus permits use of a lens which will relay information in single line scans beginning at the zenith of object 11 and terminating at the nadir of that object, or conversely.

FIG. 5 depicts a third embodiment of the present invention wherein rotating object 11 is shown within imaginary celestial sphere ABA'B' as in FIG. 1 but having television camera tube 14 inserted offcenter in the nose of the object and containing a lens 15 which permits the scanning of the circular area CDC'D', which is defined by rotating line AC' about axis AA' which is the axis of object 11 as well as of imaginary celestial sphere ABB'. Lens 15 transmits and focuses reflected or radiant energy from circular area CDC' within camera tube 14, with the focused image of area CDC' being scanned along rotating line AC'. The single line scan information is assimilated, transmitted and, at a remote station, received and displayed on a plan-position indicating oscilloscope.

In operation, a conventional television camera tube 14, e.g., a vidicon, image-orthicon or iconoscope having, in the perliminary embodiment, a 90-degree wide-angle lens, is so placed in object 11 that the circular field encompassed by lens 15 extends from substantially the zenith of object 11 to the celestial equator of the imaginary celestial sphere surrounding the object. An arc, e.g., AE in FIG. 1, of the image of the circular field is scanned repeatedly by television camera tube 14 and as object 11 revolves a repeated scanning of arc AE provides coverage of hemisphere 12. When a prescribed repetition rate, for example 3600 scans per second, occurs in phase with a rate of one revolution per second each scan line is spaced a prescribed amount, for example 0.10 degree, from the preceding scan line. In the exemplary embodiment shown in FIG. 2, FM transmitter 28 relays only video information to the antenna while in the exemplary embodiment shown in FIG. 3 PPM transmitter 30 relays video information as well as such information as temperature measurements, pressure measurements, cosmic ray intensity and so forth from other rocket borne equipment not shown.

The three alternate apertures for camera lens 15 shown in FIGS. 4A, 4B and 4C are not intended to be inclusive of all apertures which might be used in the present invention but rather illustrate some of the variety of mountings which might be used in the present invention to provide the desired scan of the object's surroundings. The telemetering by PPM transmitter 30 in FIG. 3 likewise can be accomplished in a variety of ways, the primary objective being to permit information to be relayed from several sources at selected times through a single unit in preference to using additional space and adding additional weight to accommodate several transmitters.

FIG. 6 depicts some of the means for displaying the images received and transmitted by embodiments of the present invention. FIG. 6A is a mercator projection of hemisphere 12 of FIG. 1 with the zenith of object 11 elongated into the upper line of the projection. FIG. 6B is a polar projection of area CDC'D' of FIG. 5 wherein point A of FIG. 5, which is the zenith of object 11, is the center of the polar projection. A similar projection can be obtained from a centrally mounted tube using CAC' of FIG. 5 as a sweep line, in which case a complete projection will be received for every one-half revolution of object 11. FIG. 6C shows a means for obtaining a photographic reproduction of single line scan information where photosensitive paper is moved past a single scan line at a rate equal to the revolution of object 11. FIG. 6D shows the mercator projection obtained from clipped and modulated pulses which in their original form would produce the mercator projection of FIG. 6A. It is understood that information from the signal receiver may be stored by magnetic tape recording or by other means not shown in the drawings and later displayed on one or more indicators such as those illustrated or on similar indicating devices.

The mercator projection of FIG. 6A and the polar projection of FIG. 6B display single-line scan information on luminescent surfaces having a vertical line sweep for 6A and a rotary line sweep for 6B, each sweep being synchronized with the rate of spin of object 11. Also, each sweep should be capable of ready change to accommodate any change in object spin. The scan line in either 6A or 6B may be stationary and the luminescent surface moved laterally or rotated, respectively, to correspond with the spin rate of object 11. The photographic reproduction of FIG. 6C is an example of picture reproduction from a stationary scan line onto a laterally moving synchronized photosensitive paper. The pulse position modulated mercator projection of FIG. 6D is an example of limited image reproduction through the use of clipped and blanked pulses. The information displayed is sufficient in detail for general purposes such as determining the aspect of object 11; it is insufficient to provide accurate details of the bodies and phenomena observed.

The use of large lens apertures in some instances requires the use of some kind of sun damage protective device such as a fast response automatic aperture or lens shutter or a special opaque or translucent line scan shutter, neither of which is shown in the figures. Sun damage can also occur because of sunlight reflections from the lens surfaces, the lens barrel, and the camera interior creating a general diffusion of light or "fogging." Such a condition is particularly well controlled or limited in single-line scan viewing by using a lens shade, not shown, consisting of two large vertical parallel plates separated by a distance equal to the objective lens diameter.

Many modifications and variations of the present invention are possible pursuant to the above teachings. It is therefore to be understood that within the scope of the appended claims the invention may be practiced otherwise than as specifically described.

What is claimed is:

1. A device for reporting reflected or radiant energy information incident on a revolving object to a remote location which comprises a photosensitive surface, means for focusing radiant energy information on said photosensitive surface, said photosensitive surface and said means for focusing being radially disposed on said object from the axis of rotation thereof such that radiant energy information is focused on said photosensitive surface from the field of view of said means for focusing, means including electron beam reading means for periodically scanning a line of said focused radiant energy information on said surface, means for relaying the information read by said means for scanning to said remote location, and means for displaying said relayed information at said remote location.

2. A device for reporting reflected or radiant energy information incident on a revolving object to a remote location which comprises a photosensitive surface, means for focusing radiant energy information on said photosensitive surface, said means for focusing being positioned substantially on the periphery of said object radially disposed from the axis of rotation thereof such that radiant energy information is focused at a given instant from a selected portion of the space surrounding said object, means including electron beam reading means for periodically scanning a line of the radiant energy information focused on said photosensitive surface, means for relaying the information read by said means for scanning to said remote location, receiver means for receiving said relayed information at said remote location, and means connected to said receiver means for displaying said relayed information in the form of a mercator projection.

3. A device for reporting reflected or radiant energy information incident on a revolving object to a remote location which comprises a photosensitive surface, means for focusing radiant energy information on said photosensitive surface, said means for focusing being positioned substantially on the periphery of said object radially disposed from the axis of rotation thereof such that radiant energy information is focused at a given instant from a selected portion of the space surrounding said object, means including electron beam reading means for periodically scanning a line of the radiant energy information focused on said photosensitive surface, means for selecting a portion of the radiant energy information read by said means for scanning, means for relaying said selected portion of said information to said remote location, receiver means for receiving said relayed information, and means connected to said receiver means for displaying said relayed information in the form of a mercator projection.

4. A device for reporting reflected or radiant energy information incident on a revolving object to a remote location which comprises a photosensitive surface, means for focusing radiant energy information on said photosensitive surface, said means for focusing being positioned substantially on the periphery of said object perpendicularly disposed from and tangent to the axis of rotation thereof such that radiant energy information is focused at a given instant from a selected portion of the space surrounding said axis of rotation, means including electron beam reading means for periodically scanning a line of the radiant energy information focused on said photosensitive surface, means for relaying the information read by said means for scanning to said remote location, receiver means for receiving said relayed information at said remote location, and polar display means connected to said receiver means for displaying said relayed information in the form of a polar projection.

5. A device for reporting reflected or radiant energy information incident on a revolving object to a remote location which comprises a photosensitive surface, means for focusing radiant energy information on said photosensitive surface, said means for focusing being positioned substantially on the periphery of said object such that radiant energy information is focused at a given instant from a selected portion of the space surrounding a projection of the axis of rotation of said object, the bisector of said selected portion being collinear with said axis of rotation, means including electron beam reading means for periodically scanning a line of the radiant energy information focused on said photosensitive surface, means for relaying the information read by said means for scanning to said remote location, receiver means for receiving said relayed information at said remote location, and polar display means connected to said receiver means for displaying said relayed information in the form of a polar projection.

6. A device for reporting reflected or radiant energy information incident on a revolving object to a remote location which comprises a photosensitive surface, means for focusing radiant energy information on said photosensitive surface, said means for focusing being positioned substantially on the periphery of said object such that radiant energy information is focused at a given instant from a selected portion of the space surrounding a projection of the axis of rotation of said object, the bisector of said selected portion being collinear with said axis of rotation, means including electron beam reading means for periodically scanning a line of the radiant energy information focused on said photosensitive surface, means for relaying the information read by said means for scanning to said remote location, display means connected to said receiver means for displaying said relayed line of radiant energy information, said display means including a photosensitive screen, said photosensitive screen being rotated at a rate equivalent to the rate of rotation of said object.

7. A device for reporting reflected or radiant energy information incident on a revolving object to a remote location which comprises a photosensitive surface, means for focusing radiant energy information on said photosensitive surface, said means for focusing being positioned substantially on the periphery of said object radially disposed from the axis of rotation thereof such that radiant energy information is focused at a given instant from a selected portion of the space surrounding said object, means including electron beam reading means for periodically scanning a line of the radiant energy information focused on said photosensitive surface, pulse transmitting means for transmitting a pulse train of the information read by said means for scanning, receiver means for receiving said pulse train, and means connected to said receiver means for displaying said transmitted information in the form of a mercator projection.

References Cited in the file of this patent

UNITED STATES PATENTS

| | | |
|---|---|---|
| 2,590,281 | Sziklai | Mar. 25, 1952 |
| 2,605,463 | Hirschberg | July 29, 1952 |
| 2,632,801 | Donaldson | Mar. 24, 1953 |
| 2,709,716 | Haller | May 31, 1955 |
| 2,818,466 | Larson | Dec. 31, 1957 |